United States Patent [19]

Brief

[11] Patent Number: 4,607,448
[45] Date of Patent: Aug. 26, 1986

[54] APPARATUS FOR CASTING A NET

[76] Inventor: John D. Brief, Rte. 11, Box 215, Tyler, Tex. 75709

[21] Appl. No.: 761,161

[22] Filed: Aug. 1, 1985

[51] Int. Cl.⁴ .................................... A01K 73/04
[52] U.S. Cl. ............................................. 43/8
[58] Field of Search ................................... 43/8, 7

[56] References Cited

U.S. PATENT DOCUMENTS 2,732,647  1/1956  Byars ........................................ 43/8

Primary Examiner—Nicholas P. Godici
Assistant Examiner—Carmine Cuda
Attorney, Agent, or Firm—Harold H. Dutton, Jr.

[57] ABSTRACT

A device for throwing a casting net comprising a generally circular open top receptacle having a sidewall and a bottom, the bottom having a central portion which is substantially upwardly conical toward an apex centrally located above the sidewall and a horizontal segment, the sidewall being at an obtuse angle to the horizontal segment, and a plurality of ribs extending radially inwardly from and secured to the sidewall and the horizontal segment, and a handle on the outside of the receptacle.

7 Claims, 5 Drawing Figures

U.S. Patent   Aug. 26, 1986   4,607,448
FIG. 1
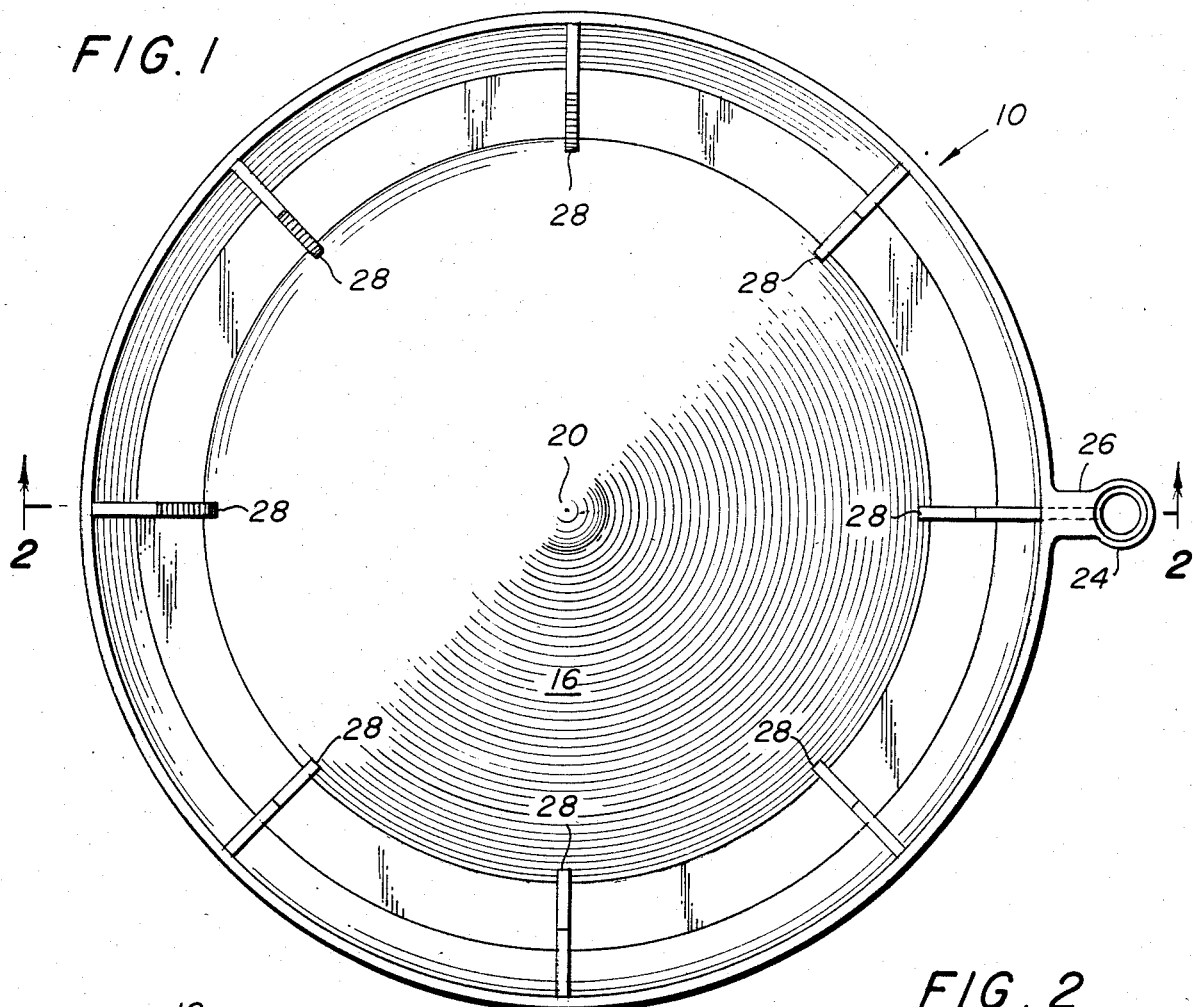
FIG. 2
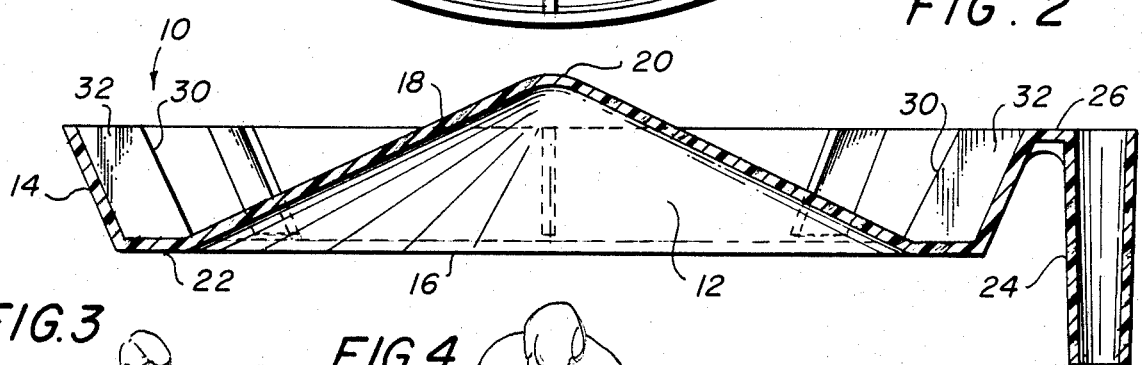
FIG.3   FIG.4   FIG.5
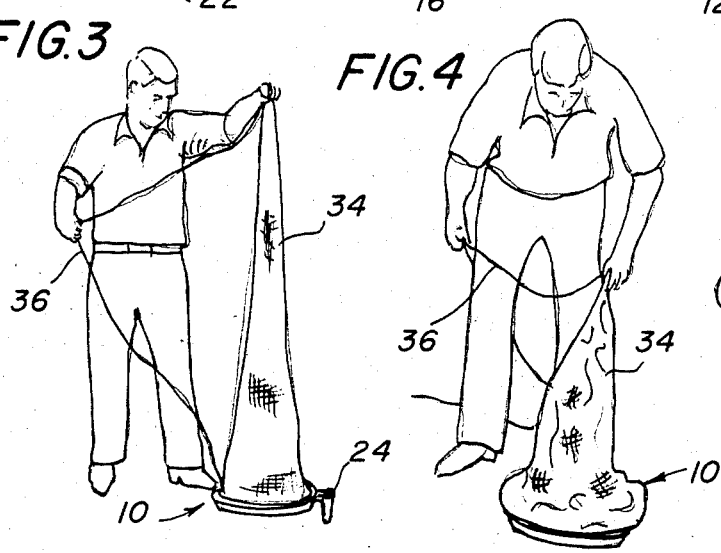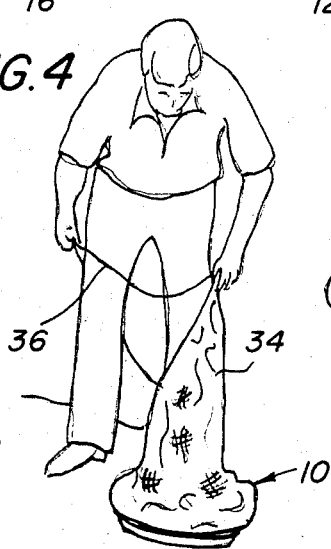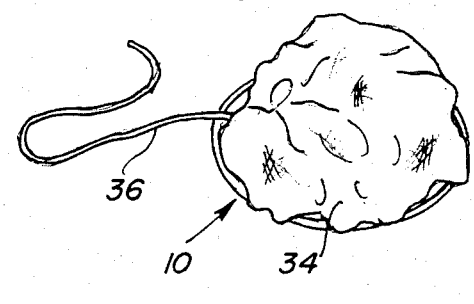

APPARATUS FOR CASTING A NET

This invention relates to an apparatus for casting a net, and in particular a fishing net. More particularly, the invention relates to a device to facilitate casting a circular, or other shape, cast-net of the type often used by fishermen.

BACKGROUND AND OBJECTS OF THE INVENTION

A cast-net is perhaps one of the oldest devices used for catching fish. Many biblical references are found to the use of such nets for fishing. Such nets are still often used by fishermen. Commercial fishermen use such nets in open water for many types of schooling fish, and leisure fishermen often used such nets to catch baitfish.

Such nets are quite simply constructed and comprise a net-like fabric of suitable mesh size, typically circular, and a cord attached around the periphery of the net to which weights are attached. The weights weigh the periphery of the net down more quickly than the center, thus trapping fish in the net.

While the use of such a net is rather simple in appearance, throwing of the net is far more difficult. Of course it is essential that the net not become entangled when it is thrown, and to gain maximum effectiveness, the outer periphery should be extended to its full limit. Such extension is aided by the weights, provided the weights do not become entangled in the mesh of the fabric.

In spite of the antiquity of the use of such nets for fishing, little has been done in the past to improve or to facilitate casting the nets in an expeditious manner. For example, U.S. Pat. Nos. 568,252 dated Sept. 22, 1896 and 2,891,342 dated June 23, 1959 both deal with devices for throwing fishing nets, but these devices are both elaborate and complicated, factors which would be serious drawbacks to any attempt to market such products.

Accordingly, a primary object of this invention is to provide an improved device for throwing a cast net.

Another object of this invention is to provide a device for throwing a cast net which is lightweight and of simple construction.

Still a further object of this invention is to provide a device for throwing a cast net which is highly effective and easy to use.

These and other objects and advantages of this invention will become apparent upon consideration of the following description and claims, when taken together with the accompanying drawings.

BRIEF DESCRIPTION OF THE INVENTION

The apparatus of the present invention comprises a shallow pan-like receptacle having a side wall and a bottom which is generally upwardly conical, with the apex of the conical bottom being located generally near the center of the pan, and tapering downwardly and outwardly toward the side wall. Positioned around the interior of the side wall are a plurality of spaced ribs extending from the side wall toward the center of the receptacle.

On the outside of the side wall, at any desired location, is a handle by which the apparatus is grasped.

In use, a circular (or other shape) cast-net is held at the center and allowed to hang from the center so that the outer periphery is gathered and the weights rest on the bottom of the receptacle and between the ribs. In this manner, the ribs act to prevent the weights from sliding around inside the pan, an action which would cause them to become entangled with the mesh of the net.

Then, when the weights are thusly positioned, the net is lowered down into the pan. The upstanding conical bottom helps to keep the net from becoming entangled. The user then grasps the apparatus by the handle, and by means of a horizontal, arcuate throwing movement, the net is thrown out of the pan. With minimal practice, the user will be able to throw such a net quite proficiently. The arcuate motion will cause a spinning of the net as it is thrown, with the result that the centrifugal force acting on the weights will cause them to extend the net to its full circular limit, for maximum effectiveness.

DESCRIPTION OF THE DRAWINGS

The invention will now be described in greater detail with reference to the accompanying drawings, in which:

FIG. 1 is a top plan view of the device of this invention;

FIG. 2 is a cross-sectional view of the device of the present invention taken along lines 2—2 of FIG. 1 and viewed in the direction of the arrows;

FIGS. 3 and 4 are schematic views of the loading of a cast net into the device; and FIG. 5 is a perspective view showing a cast net loaded into the device.

DESCRIPTION OF THE PREFERRED EMBODIMENTS

Referring to FIGS. 1 and 2, the device of the invention, generally designated 10, is seen to comprise a receptacle 12 preferably formed of molded plastic, but equally suitably from stamped metal or other appropriate materials and methods.

The receptacle 12 is provided with a side wall 14 portion which extends upwardly from a bottom portion 16, and preferably at an obtuse angle thereto as seen in FIG. 2. This angled side wall 14 facilitates throwing the net as it permits the net to leave the receptacle 12 more easily.

The bottom portion 16 includes an upwardly and inwardly extending central conical section 18 having an apex at 20. Preferably the conical bottom portion 16 extending far enough upwardly that the apex 20 is slightly above the side wall 14, again as shown in the drawing. In the preferred embodiment, the bottom portion also includes a horizontal segment 22 connecting the side wall 14 and the conical portion 18. This segment 22 provides sufficient area for the net in the receptacle.

The conical bottom portion 16 also facilitates placement of the net in the receptacle 12 in a more orderly fashion, which in turn enables a more accurate throwing of the net.

The outside surface of the receptacle 12 is provided with a handle 24, located at any point around the wall 14. Again in the preferred embodiment, the handle 24 is integrally molded with the receptacle, whereby it is connected to the body of the receptacle 12 by a molded rib section 26, but in the case of a metal receptacle, for instance, a handle could be attached by welding, riveting, or any similar technique.

The interior of the receptacle 12 is provided with a plurality of equally spaced ribs 28. These ribs 28 are attached to the sidewall 14 and the bottom portion 22, and may also be attached a short distance up the conical bottom portion 18, as shown in the drawing. The ribs 28 preferably have their innermost edges 30 substantially parallel to the side wall 14 and have their top edges 32 lying substantially in the plane of the top edge of the side wall 14 so as to not project above the side wall 14.

The ribs 28 are shown to be eight in number in the drawings, although a greater or lesser number of such ribs could be used. These ribs 28 function during the throwing of the net to keep the weights on the net from spinning around on the inside of the receptacle 12 as the net is thrown.

As shown in FIGS. 3-5 of the drawings, in order to use the device of this invention, a circular or other shape casting net 34 is held near its center whereby the weights will hang down into a generally circular pattern. The net is lowered so that the weights enter the receptacle 12, and due to gravity will slide down the conical bottom portion 18 toward the side wall 14 with the weights thereof coming to rest between the ribs 28. Then, the net is continually lowered until it is substantially contained by the receptacle 12, while the retaining or tether line 36 is kept out of the net.

The user then grasps the device 10 by the handle 24, and is ready to throw the net. By moving one's arm and wrist in an arcuate fashion from close to the body to an outward position in a "backhand" manner, with a slight sequential upward and downward motion, the net is caused to spin as it is discharged from the device. This spinning then in turn causes the weights on the net, due to centrifugal force, to extend the net in a circular fashion. With but minimal practice, the user can become quite adept at throwing the net and obtaining an accurate throw without entangling the net.

While the invention has been described as having certain preferred features and embodiments, it will be understood that it is capable of still further variation and modification without departing from the spirit of the invention, and this application is intended to cover any and all variations, modifications and adaptations of the invention as fall within the spirit of the invention and the scope of the appended claims.

What I claim is:

1. A device for throwing a casting net comprising receptacle means for holding a net having a continuous sidewall and a bottom, and open at the top thereof, said bottom having a central portion comprising substantially upwardly conical means for supporting the net to help keep the net from becoming entangled, and means comprising a plurality of ribs extending radially inwardly from and secured to said sidewall for preventing net weights from sliding around said receptacle, and handle means on the outside of said receptacle.

2. A device as in claim 1 and wherein said sidewall is at an obtuse angle to said bottom.

3. A device as in claim 2 and wherein said bottom includes a horizontal segment between said bottom and said sidewall.

4. A device as in claim 3 and wherein said ribs are connected to said side wall, said horizontal segment and said conical portion.

5. A device as in claim 4 and wherein said conical portion extends to an apex above said sidewall.

6. A device as in claim 5 and wherein said receptacle is substantially circular.

7. A device for throwing a casting net comprising generally circular open top receptacle means for holding a net, said receptacle means having a continous sidewall and a bottom, said bottom having a central portion which is substantially upwardly conical toward an apex centrally located above said sidewall and a horizontal segment, for supporting the net to help keep the net from becoming entangled, said sidewall being at an obtuse angle to said horizontal segment, means for preventing net weights from sliding around said receptacle comprising a plurality of ribs extending radially inwardly from and secured to said sideWall and said horizontal segment, and handle means on the outside of said receptacle.

* * * * *